United States Patent [19]
Schon

[11] Patent Number: 5,145,274
[45] Date of Patent: Sep. 8, 1992

[54] CONNECTOR FOR FASTENING A WINDSHIELD WIPER BLADE TO A WINDSHIELD WIPER ARM

[75] Inventor: Wilfrid Schon, Saint-Etienne/Usson, France

[73] Assignee: Valeo Systemes D'Essuyage, Montigny-le-Bretonneux, France

[21] Appl. No.: 670,970

[22] Filed: Mar. 18, 1991

[30] Foreign Application Priority Data

Mar. 19, 1990 [FR] France .................. 90 03473

[51] Int. Cl.⁵ .................................... F16C 11/00
[52] U.S. Cl. ....................... 403/79; 403/23; 15/250.32
[58] Field of Search ........... 403/79, 23; 15/250.32, 15/250.42, 250.35, 250.36

[56] References Cited

U.S. PATENT DOCUMENTS 4,118,825 10/1978 Hoebrechts et al. ............ 15/250.32
4,670,934 6/1987 Epple et al. ..................... 15/250.32

FOREIGN PATENT DOCUMENTS

| 3618326 | 12/1987 | Fed. Rep. of Germany . |
| 2753961 | 4/1979 | Fed. Rep. of Germany ... 15/250.32 |
| 2829437 | 1/1980 | Fed. Rep. of Germany . |
| 3403553 | 8/1985 | Fed. Rep. of Germany ... 15/250.32 |
| 2631300 | 11/1989 | France . |
| 872862 | 7/1961 | United Kingdom ............ 15/250.32 |
| 2193432 | 2/1988 | United Kingdom ............ 15/250.32 |

Primary Examiner—Andrew V. Kundrat
Attorney, Agent, or Firm—Dennison, Meserole, Pollack & Scheiner

[57] ABSTRACT

A connector for fastening a windshield wiper arm and a windshield wiper blade together has a generally U-shaped longitudinal cross section, with longitudinal edge portions extended in side walls of the connector body, the side walls being joined together through a transverse wall so as to define a free space between them. A hood is articulated on to the transverse wall.

13 Claims, 2 Drawing Sheets

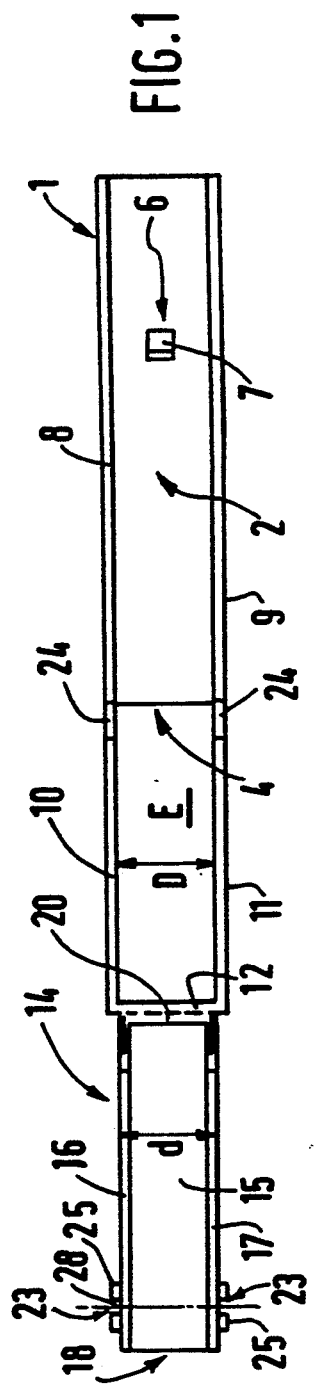
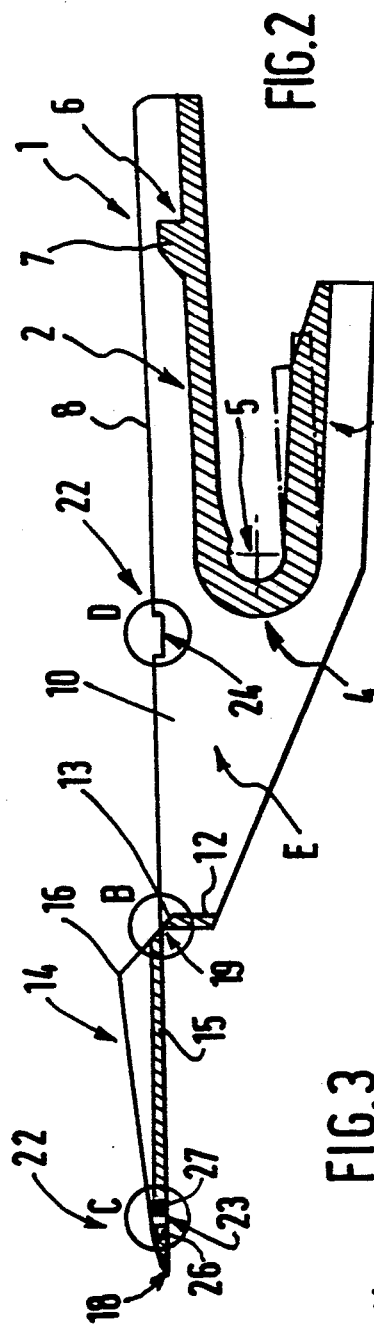
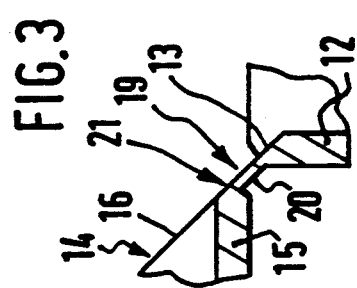
FIG.1 FIG.2 FIG.3 FIG.4 FIG.5

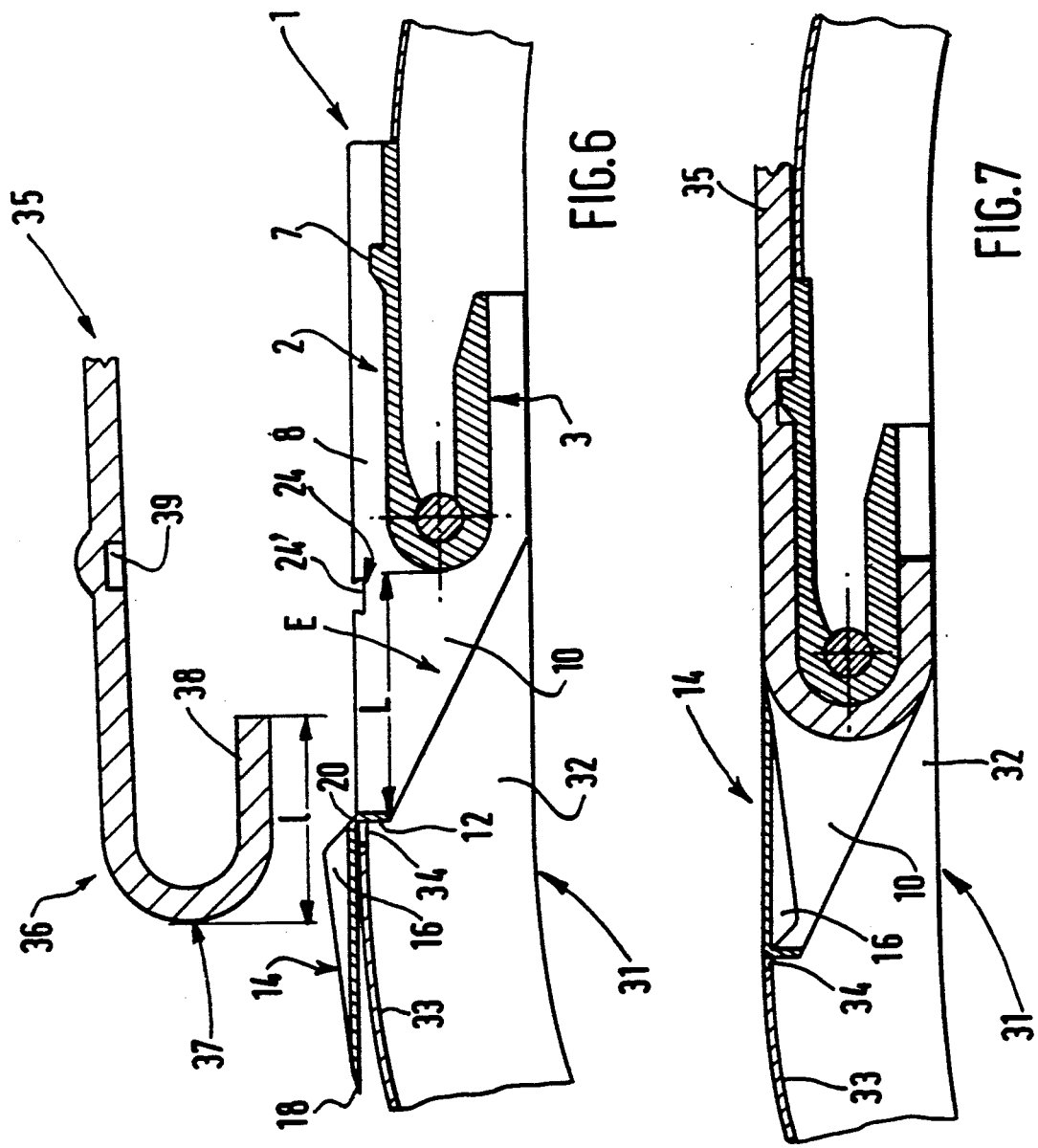

CONNECTOR FOR FASTENING A WINDSHIELD WIPER BLADE TO A WINDSHIELD WIPER ARM

FIELD OF THE INVENTION

The present invention relates to a connector for fastening a windshield wiper blade to a windshield wiper arm.

BACKGROUND OF THE INVENTION

Connectors for this purpose in the prior art usually have a longitudinal profile which is substantially in the form of a U, having two branches and including hook means for hooking over the wiper arm, together with means for receiving an axis or pin carried by the windshield wiper blade, whereby the arm and the blade are articulated together.

In application to the fastening of a blade and an arm together, where the arm has a curve end portion, the arrangement is conventionally such that the connector is mounted in an opening formed in the main mounting element of the blade, with the transverse axis which articulates the arm and the blade together passing through this opening; and the connector is made so that it can lie in the concavity of the hooked end portion of the arm, while being held firm in that position by suitable means.

When attention of any kind is needed for the blade, the longitudinal dimension of the opening in the blade is such that it is not necessary to lift the wiper arm by a very great distance in order to separate the connector from it. In practical terms, the space between the securing pin and the outer transverse edge of the opening is so dimensioned that the maximum dimension of the hooked end portion of the arm is able to fit within this space. Thus, during fitting or removal of the blade with respect to the arm, the arm lies substantially parallel to the blade but is able either to leave or to enter this space without requiring much displacement of the arm.

As has already been disclosed in German patent No. 2 829 437, the connector includes edge portions which are extended, in a direction opposite to those of the free ends of the branches of the connector body, in longitudinal side walls of the connector body which are joined together at their ends by a transverse wall, these walls cooperating with the longitudinal and transverse edges of the opening formed in the wiper blade. These three walls of the connector body thus protect the end of the arm and the edges of the opening from any possible damage during operations on the windshield wiper.

In use, there therefore exists a free space between the curved or hooked end portion of the arm, the longitudinal edges and the transverse edge of the opening in the blade. This is not only detrimental to the appearance of the whole, but also enables undesirable matter to penetrate into the free space, which can in turn be detrimental to proper functioning of the wiper blade.

DISCUSSION OF THE INVENTION

The present invention enables the drawbacks mentioned above to be overcome, by providing a connector in which the useful free space described above is available at all times for fitting and dismantling operations, but in which this free space is then closed.

In accordance with the present invention, a connector for fastening a windshield wiper blade to a windshield wiper arm, the connector having a generally U-shaped longitudinal profile defining two branches having edge portions which are extended in longitudinal walls, the latter being connected together by means of a transverse wall so as to define a free space between them, is characterized in that the connector includes a hood.

The invention enables the free space which is defined between the curved end and the transverse edge of the opening in the wiper blade to be covered by a member which, in addition improves the appearance of the assembly.

Further features and advantages of the invention will now appear more clearly from the description which follows, which is given by way of example only and with reference to the accompanying drawings.

BRIEF DESCRIPTION OF THE DRAWINGS

FIG. 1 shows a plan view of a connector in accordance with the invention.

FIG. 2 shows a view in longitudinal cross section, taken on the line 2—2 in FIG. 1.

FIG. 3 is a detail view on a larger scale, as seen in the circled portion B in FIG. 2.

FIG. 4 is a view on a larger scale as seen in the circled portion C in FIG. 2.

FIG. 5 is also on a larger scale, but as seen in the circled portion D in FIG. 2.

FIG. 6 shows the arrangement of the connector according to the invention on a blade.

FIG. 7 is a view in which the connector according to the invention is shown in a final assembled configuration.

DESCRIPTION OF A PREFERRED EMBODIMENT OF THE INVENTION

Referring first to FIGS. 1 and 2, these show a connector 1 with a longitudinal profile substantially in the form of a U, such as to have two branches 2 and 3, which are resiliently flexible with respect to each other due to the presence of a curved portion 4.

In a manner known per se, the connector 1 also has a pivot pin receiving means comprising a notch 5 with a circular transverse cross section, situated in the concave part of the connector 1. The latter also includes hook means 6 provided on one of its branches, in this example the upper branch 2. This hook means consists generally of a lug 7. Again in a known manner, the connector 1 includes on each side an edge portion 8, 9 comprising a rib which is substantially orthogonal to the plane of the branches 2 and 3, these edge portions extending along the full length of the branches. As is best seen in FIGS. 1 and 2, each of the edge portions 8 and 9 is extended, in the same plane and from the curved portion 4 of the connector 1, in a wall 10, 11 respectively. The wall 10 is substantially parallel to the wall 11, to which it is connected through a transverse wall 12 which is spaced away from the curved portion 4. The walls 10, 11 and 12, together with the curved portion 4 of the connector 1, define a free space E which is generally rectangular in shape. The walls 10 and 11 are substantially in the form of a right angled trapezium, with the inclined side of this trapezium being defined by the lower edge of the wall 10 or 11. This edge joins the edge rib 8 or 9 of the branch 3 to the lower end of the transverse wall 12.

A hood 14 is hinged about the upper edge 13 of the transverse wall 12, and extends from it. The hood 14 comprises a base wall 15 and two wing portions 16 and 17, which are also flat and orthogonal to the base wall 15, so as to define a transverse cross section in the form of a U, in which the base wall 15 is substantially perpendicular to the wall 12 in the rest position. The shape of the wing portions 16 and 17 is such that their height decreases with distance from the upper end 13 of the transverse wall 12, to reduce to zero at the free end 18 of the hood 14.

In other words, and with reference specifically to FIG. 2, the wing portions 16 and 17 are substantially triangular in shape, with the hypotenuse of the triangle being coincident with the internal surface of the base wall 15 which defines the base of the U.

The distance d between the two outer surfaces of the wing portions 16 and 17 is preferably at least equal to the distance D measured between the internal surfaces of the longitudinal walls 10 and 11, that is to say the surfaces facing into the space E.

Referring now in addition to FIG. 3, the hood 14 is mounted so as to hinge with respect to the upper end 13 of the transverse wall 12, by means of an articulation 19 in the form of a film hinge. The articulation 19 comprises a thin flexible wall portion 20 connecting the upper end 13 of the transverse wall 12 with the inner end 21 of the hood 14 adjacent the transverse wall 12. The hood 14 preferably carries locking means 22 for holding it closed in use.

Referring now more particularly to FIGS. 4 and 5, the locking means 22 comprise a male element 23, which in this example is carried by the hood 14, in cooperation with a female element 24 carried by the connector 1. As is best seen by examination of FIG. 1 in association with FIG. 4, the male element 23 consists of a protuberance 25 which projects outwardly from the wing portions 16 and 17 of the hood. The protuberances 25 lie in the same plane as that in which the base wall 15 of the hood 14 lies. Each protuberance 25 comprises a pair of lugs 26 and 27, which are separated from each other by a space 28, such that, between the lugs 26 and 27, there is some relative elasticity.

The lug 26 is symmetrical with the lug 27, with respect to the axis XX' which bisects the free space 28. The lug 26 has a free wall 29 at the side lug furthest from the space 28. This free wall 29 is so shaped that the cross section of the lug 26 diminishes going from the surface of the base wall 15 that carries the wing portions 16 and 17.

The lug 27 has, in longitudinal section, a configuration or profile which is symmetrical to that of the longitudinal section of the lug 26. In other words the general shape of the protuberance 25, comprising the two lugs 26 and 27 together, is that of an isosceles trapezium or truncated isosceles triangle, the base of which is coincident with the surface of the base wall 15 carrying the wing portions 16 and 17. The small base line of the trapezium, i.e. its side opposite and parallel with the large base coincident with the base wall 15, is itself coincident with the opposite surface of the base wall 15, i.e. that which is opposite the surface of the base wall carrying the wing portions 16 and 17.

Referring now to FIG. 5, the female element 24 of the locking means 22 is carried by the walls 10 and 11 of the connector 1. The female element 24 is defined by an aperture 24' which is of the same shape as the "isosceles trapezium" defined by the lugs 26 and 27. The aperture 24' is thus complementary to the letter, but is inverse to the shape of the male element 23, as can be seen by comparing FIGS. 4 and 5, so that the small base of the isosceles trapezium of the female element 24 is aligned with the terminal free longitudinal edges 30 of the longitudinal wall 10 or 11 concerned.

The longitudinal positions of the male element 23 and of the female element 24 are so chosen that these two elements are able to cooperate with each other when the hood 14 has been pivoted about the upper end 13 of the transverse wall 12, i.e. the elements 23 and 24 are substantially equidistant from the end 13.

The use of the connector described above will now be explained more fully with reference to FIGS. 6 and 7. The connector 1 is adapted to be carried by a windshield wiper blade 31 having a main mounting element 32 in which an opening 34 is formed in its base wall 33, in known manner. The opening 34 is provided for the purpose of receiving the connector 1 and a windshield wiper arm 35, in such a way that the arm is then able to be articulated to the blade 31. The end portion 36 of the arm 35 is, in this example, shaped in the form of a hook 37, such that the connector 1 can then fit snugly in the concave part of the hook as shown in FIG. 7.

As is best seen in FIG. 6, the length l, measured between the outer wall of the curved end of the hook 37 and the free end of its lower or terminal branch 38, is smaller then the distance L measured from the internal surface of the wall 12 to the outer projecting end of the curved portion of the connector which joins the two branches 2 and 3 of the latter. The opening 34 does of course have a longitudinal dimension such that it can receive the connector 1 in its entirety with a slight clearance, that is to say the dimension measured between the outer surface of the wall 12 to the free end of the larger branch of the connector, i.e. in this example the branch 2. Thus, in a first step in the assembly operation, seen in FIG. 6, the connector is mounted in a known manner on the axis provided by the opening 34 of the wiper blade. In this position, the wall 12 lies facing the transverse edge of the opening 34, with the edge portions 8 and 9 and the walls 10 and 11 being in sliding contact with the longitudinal edges of the opening 34. In a second step, the hook-shaped curved end portion 37 of the arm 35 is aligned with the free space E defined by the transverse wall 12 and by the longitudinal walls 10 and 11. It is then moved at right angles to the longitudinal direction of the wiper blade, so as to introduce the curved end portion 36 into the free space E until the interior or concavity of the hook 37 is aligned with the convex portion of the connector 1.

In a right to left movement (in relation to FIG. 6), the assembly comprising the wiper blade 31 and the connector 1 is then moved so that the connector 1 engages by translational movement in the interior of the hook 37, with the lug 7 carried by the branch 2 coming into cooperation with a recess 39 which is formed on the windshield wiper blade 34. Once this configuration has been reached, the hood 14 is rotated by engaging its free end 18 manually so as to hinge it about the film hinge 20, thereby closing the hood back over the walls 10 and 11 to the position shown in FIG. 7.

During this hinging movement, the wing portions 16 and 17 of the hood become inserted into the free space E by sliding action of their respective wall surfaces, while the male elements 23 of the locking means, carried by the hood 14, engage with a snap fit in the female elements 24 carried by the longitudinal walls 10 and 11, due to the elasticity of the lugs 26 and 27 relative to each other. During this clipping operation, the lugs 26 and 27 tend to move towards each other in the intermediate space 28, by cooperation of the free end walls 29 of the lugs with the inclined edges of the aperture 24' of the female element 24. The lugs 26 and 27 return to their initial state once the male element 23 has fully penetrated into the female element 24. The inclined end walls 29 of the male element 23 and the inclined walls of the aperture 24' of the female element 24 are then in mating contact.

Thus the hood 14 not only protects the free space E from penetration by any foreign bodies, but also, by obscuring this empty space, improves the appearance of the assembly comprising the wiper blade and wiper arm. In this connection, the free end 18 of the hood 14 partly covers the end of the hook 37 of the arm 35.

The present invention is not limited to the embodiment described above, but embraces all possible variants. In particular, hinging of the hood may be effected from one of the longitudinal walls 10 or 11.

What is claimed is:

1. An insertable connector securing a windshield wiper blade to a windshield wiper arm, comprising a body having two longitudinal side walls, a transverse wall joining the two side walls to define a free space within the connector body, the side walls together defining two branches whereby the connector has a generally U-shaped longitudinal profile, the connector further comprising edge portions extending by the said side walls, and the connector also including a hood carried on the connector body integral therewith and means mounting the hood for pivotal movement with respect to the body of the connector, so as to close the said free space defined between the said walls.

2. A connector according to claim 1, wherein the means mounting the hood for the said pivotal movement are on one of the said walls.

3. A connector according to claim 1, wherein the means mounting the hood comprise hinge means.

4. A connector according to claim 3, wherein the hinge means comprise a film hinge.

5. A connector according to claim 1, further including locking means carried by the hood and by the body of the connector, for locking the hood in a closed position over the said free space.

6. A connector according to claim 5, wherein the locking means comprise a male element and a female element for cooperation with the male element.

7. A connector according to claim 6, wherein the male element comprises a protuberance consisting of two lugs defining a space between them.

8. A connector according to claim 7, wherein the protuberance has a general configuration, in longitudinal section, of an isosceles trapezium.

9. A connector according to claim 6, wherein the hood carries the male element and the longitudinal walls of the connector body carry the female element.

10. A windshield wiper assembly comprising a main mounting element (32) for supporting a wiper blade, said mounting element having a base wall (33) with depending side walls, an opening (34) in said base wall, a windshield wiper driving arm (35) having an end portion in the shape of a hook (37), means for connecting said hook to said mounting element, said connecting means comprising a separable unitary connector (1) formed in the shape of a U-shaped channel having side walls (8, 9), and externally curved portion (4) and an internal notch (5), said side walls having extensions (10, 11) extending away from said curved portion (4) and joined by a transverse wall (12) to define a connector opening (E), said connector (1) being seated in said opening (34) with said notch (5) engaging a component secured to said mounting element (32), said hook (37) seated in said connector opening (E) and engaging said externally curved portion (4); and a hood (14) pivotally attached to said transverse wall (12) for pivotal movement to a position covering said connector opening (E).

11. A windshield wiper assembly according to claim 10 including locking means (24, 25) on said hook (14) and said walls (8, 9) for locking said hood in said covering position.

12. A windshield wiper assembly according to claim 10 wherein said hood is pivotally attached to said transverse wall by means of a film hinge (19).

13. A windshield wiper assembly according to claim 10 wherein said hood is provided with wing portions (16, 17) which extend into said connector opening (E) when in said covered position.

* * * * *